June 29, 1965 J. S. MURRAY 3,192,483
TRANSISTOR AMPLIFIERS INCLUDING D.C. FEEDBACK MEANS
Original Filed April 30, 1958
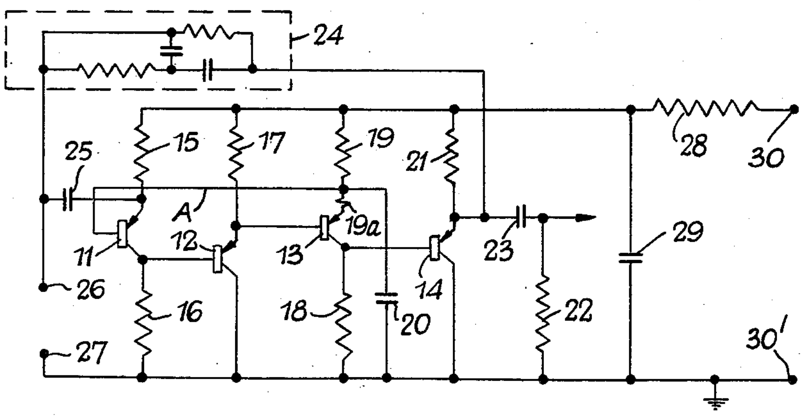
INVENTOR.
JOHN SOMERSET MURRAY
BY Malcolm W. Fraser
ATTORNEY

United States Patent Office 3,192,483
Patented June 29, 1965

3,192,483

TRANSISTOR AMPLIFIERS INCLUDING D.C. FEEDBACK MEANS

John Somerset Murray, 7 Ranulf Road, London, England

Original application Apr. 30, 1958, Ser. No. 732,017. Divided and this application Apr. 3, 1963, Ser. No. 270,457
Claims priority, application Great Britain, May 2, 1957, 14,029/57
3 Claims. (Cl. 330—19)

This invention relates to transistor amplifiers.

The instant application is a division of application Serial No. 732,017, filed April 30, 1958, now abandoned.

It is known, for example from my U.S. Patent No. 2,959,741, to provide a determined base-collector bias for one transistor of a transistor amplifier by means of a D.C. conductive connection between the base and the collector of the said one transistor, said D.C. conductive connection including the base-emitter path of at least one other transistor of the amplifier and also including, between the base of the said one transistor and the emitter of the said other transistor, a resistance whose value was always assumed to be necessarily considerable in order that it should not unduly shunt the base of the said one transistor in respect of signals applied thereto for amplification.

The biassing arrangement disclosed in my said patent provides for the said one transistor a base-collector bias which is highly stabilised but which, nevertheless, is to some extent temperature-dependent inasmuch as the temperature-dependent collector leakage current of the said one transistor flows in the said resistance across which, consequently, there is developed a temperature-dependent voltage whose magnitude (and, more particularly, whose temperature-dependent variation) cannot be negligible because of the considerable value of the resistance itself.

However, if the input impedance of an amplifier of this general kind, having the said one transistor in its input stage, is not required to be high, the input signals to be amplified may be applied to the emitter of the said one transistor and they are then no longer directly shunted by the said resistance comprised by the said D.C. conductive connection and connected to the base of the said one transistor. It is then no longer necessary that this resistance should have a value greater than some considerable minimum value (that previously contemplated having been some 10,000 to 30,000 ohms, or ten times the input impedance, to the base of the said one transistor when this latter was connected in a grounded-emitter configuration) and it becomes possible to specify conditions such that the base-collector bias provided for the said one transistor shall be virtually independent of temperature variation.

With the achievement of this object in view, there is provided according to the present invention a transistor amplifier comprising a grounded-base first stage including a first transistor and collector resistance and emitter resistance therefor together with signal input means connected to the emitter thereof, at least one further, grounded-emitter, stage comprising a further transistor and collector resistance and emitter resistance therefor together with signal output means connected to the collector thereof, D.C. conductive signal carrying means connected between the collector of the said first transistor and the base of the said further transistor, and a D.C. conductive feedback means connecting the base of the said first transistor to a point on the emitter resistance for the said further transistor, the said D.C. conductive signal carrying means and D.C. conductive feedback means constituting with the base-emitter path of the said further transistor a D.C. conductive connection extending from the collector to the base of the said first transistor and establishing the base-collector bias thereof and thereby the current level thereof, wherein the total D.C. resistance of the said signal carrying means and of the said feedback means is less than the input impedance at the base of the said first transistor would be if that transistor were connected in a grounded-emitter configuration and biassed to the same current level.

For normal transistors this will mean that the said total D.C. resistance is not more than about 3000 ohms; and, in the particular case where the said signal carrying means is a direct connection, that will be the maximum permissible value of the resistance connected between the base of the said one transistor and the emitter of the said further transistor.

Preferred embodiments of a transistor amplifier according to the invention are described below with reference to the single accompanying drawing showing one such embodiment.

The amplifier shown in the drawing comprises four p-n-p transistors 11, 12, 13 and 14 connected in first, second, third and fourth stages respectively of the amplifier, the first stage being a grounded-base stage and including emitter resistance 15 and collector load resistance 16, and the second stage being a grounded collector stage which includes emitter resistance 17, the base of the transistor 12 being connected directly to the collector of the transistor 11. The base of the transistor 13 is connected directly to the emitter of the transistor 12, and the third stage, which includes the transistor 13, also includes collector load resistance 18 and emitter resistance 19 in series with a resistance **19*a* included for signal feedback purposes. The third stage is a grounded-emitter stage, its emitter resistor 19 being decoupled to earth by a condenser 20; and, through a direct connection A from the base of the transistor 11 to the junction of the resistors 19 and 19*a*, the base of the transistor 11 in the grounded-base first stage is also decoupled to earth through the condenser 20**.

The collector of the transistor 13 is connected directly to the base of the transistor 14 in the grounded-collector fourth stage, which includes emitter resistance 21, and output signals from the amplifier are developed across an output resistance 22 of which one end is earthed and the other end is connected through an output condenser 23 to the emitter of the transistor 14.

The emitter of the transistor 14 is also connected back, through a signal feedback network 24 of known kind and through an input condenser 25, to the emitter of the transistor 11. When the amplifier is in use, a source of signals to be amplified is connected between its input terminals 26 and 27, so that the signals are applied to the emitter of the transistor 11.

In this amplifier the direct connection A constitutes the said D.C. conductive feedback means, and is of zero impedance. The said D.C. conductive signal carrying means is constituted by the base-emitter path of the transistor 12, together with the direct connections of its base and emitter respectively to the collector of the transistor 11 and to the base of the transistor 12.

An amplifier of the kind shown in the drawing is well adapted to be used as a pre-amplifier feeding signals from a gramophone pick-up head to a main valve-amplifier. The relative immunity of the transistor amplifier, due to the substantially zero resistance in the base-collector bias loop for the transistor 11 renders it substantially insensitive to chassis temperature variations due to the relatively large heat dissipation of the valve amplifier, and the feedback network 24 is of a kind well adapted to provide the frequency-characteristic correction required by a gramophone pick-up head. The use of a single decoupling condenser 20 for the first and third stages obviates the introduction of unwanted time constants in the circuit, as well as representing a saving of components. The resistance 19*a* included in the bias loop is selected, in view of the emitter current of the transistor 13, to set the base-collector bias of the transistor 11 at the required value; and when, as shown, the resistance 19*a* is undecoupled by the condenser 20 it provides degenerative feedback to the third stage, which increases the bandwith of that stage and assists the stability of the amplifier at high frequencies under feedback conditions. If the value of resistance 19*a* required to produce the desired bias for the transistor 11 is greater than that required to produce the desired amount of signal feedback in the third stage, the condenser 20 can be connected to decouple not only the resistance 19 but also a part of the resistance 19*a* in series therewith.

The illustrated amplifier takes its supply voltage, applied between terminals 30 and 30′, from the supply voltage provided for a valve amplifier which it feeds, and for this purpose it includes a suitable voltage-dropping resistance 28 and a large decoupling condenser 29.

Other component values, where the four transistors are each Ediswan XB103, may suitably be as follows:

| Resistance: | Ohms |
|---|---|
| 15 | 12K |
| 16 | 22K |
| 17 | 4.7K |
| 18 | 2.2K |
| 19 | 1.8K |
| 19*a* | 150 |
| 21 | 3.3K |
| 22 | 39K |

| Capitance: | μF. |
|---|---|
| 20 | 1000 |
| 23 | .25 |
| 25 | 100 |

It will be understood that the fourth stage of the illustrated amplifier is not essential to the invention, but that it serves to isolate the output point (and the overall feedback connection) from the third stage.

Also, the second stage could, within the scope of the invention, be omitted, the collector of the transistor 11 being then connected directly to the base of the transistor 13.

What I claim is:

1. A transistor amplifier comprising a grounded-base first stage including a first transistor and collector resistance and emitter resistance therefor together with signal input means connected to the emitter thereof, at least one further, grounded-emitter stage comprising a further transistor and collector resistance and emitter resistance therefor together with signal output means connected to the collector thereof, D.C. conductive signal carrying means connected between the collector of the said first transistor and the base of the said further transistor, and a D.C. conductive feedback means connecting the base of the said first transistor to a point on the emitter resistance for the said further transistor, the said D.C. conductive signal carrying means and D.C. conductive feedback means constituting with the base-emitter path of the said further transistor a D.C. conductive connection extending from the collector to the base of the said first transistor and establishing the base-collector bias thereof and thereby the current level thereof, wherein the total D.C. resistance of the said signal carrying means and of the said feedback means is less than the input impedance which would be present at the base of the said first transistor if said first transistor were connected in a grounded emitter configuration and biased to the same current level.

2. An amplifier as claimed in claim 1, wherein the said D.C. conductive feedback means is a direct connection of substantially zero resistance.

3. An amplifier as claimed in claim 1, wherein there is provided between the said first stage and the said further stage an intermediate, grounded-collector stage comprising an intermediate transistor and emitter resistance and collector supply means therefor, the base and emitter of the said intermediate transistor being respectively connected D.C. conductively to the collector of the said first transistor and to the base of the said further transistor, the base-emitter path of the said intermediate transistor constituting, together with the said connections of its base and emitter respectively, the said D.C. conductive signal carrying means.

References Cited by the Examiner

UNITED STATES PATENTS 3,140,448 7/64 Murray ............... 330—19

ROY LAKE, *Primary Examiner.*

NATHAN KAUFMAN, *Examiner.*